United States Patent [19]
Hetzer et al.

[11] 3,814,135
[45] June 4, 1974

[54] HOSE AND TUBING ASSEMBLY CLOSURES

[75] Inventors: Harry Hetzer, Depew; Augustine V. Cosentino, Tonawanda, both of N.Y.

[73] Assignee: GTI Corporation, Pittsburgh, Pa.

[22] Filed: Mar. 2, 1972

[21] Appl. No.: 231,261

[52] U.S. Cl. .................................... 138/89, 138/96 T
[51] Int. Cl. ........................................... F16i 55/10
[58] Field of Search ...... 138/89, 96 R, 96 T, DIG. 7

[56] References Cited
UNITED STATES PATENTS

| | | | |
|---|---|---|---|
| 2,727,651 | 12/1955 | Mickelson | 138/96 T |
| 3,574,312 | 4/1971 | Miller | 138/89 |
| 3,606,073 | 9/1971 | Burke | 138/96 T |
| 3,661,291 | 5/1972 | Hetzer | 138/96 T |

*Primary Examiner*—James J. Gill
*Assistant Examiner*—Anthony V. Ciarlante
*Attorney, Agent, or Firm*—Weingarten, Maxham, & Schurgin

[57] ABSTRACT

A closure is provided for hose and tubing end assemblies having a shoulder adjacent one end of the hose or tubing and a rotatable nut bearing on said shoulder to provide a seal on installation, which closure is made up of a cylinder of flexible resin open at one end and closed at the other and adapted to be inserted into the threaded portion of the nut and to engage the threads of the nut with an interrupted thread at the open end of the cylinder and to engage the end face of the nut with a radial external flange adjacent the closed end.

6 Claims, 3 Drawing Figures

HOSE AND TUBING ASSEMBLY CLOSURES

This invention relates to hose and tubing assembly closures and particularly to a single use, discardable protective closure for hose and tubing end assemblies having a sealing shoulder and nut arrangement.

Large numbers of hose and tubing end assemblies are made and used for a great variety of purposes including fuel and oil lines for internal combustion engines, brake lines, water and other fluid lines, and air and other gas lines. These assemblies are made with a sealing shoulder on the hose fitting or on the tubing end and a free nut behind the shoulder adapted to seal against the same. It is essential that both the nut and shoulder be kept clean and undamaged if the connection using them is to be free of leakage. Prior to this invention, threaded plugs have been used in some instances to protect these assemblies but in most cases the ends have remained unprotected because of the substantial expense of prior art devices and their relative lack of reliability.

The present invention provides a protective closure which successfully and satisfactorily protects these hose and tubing end assemblies.

Preferably we provide a closure for hose and tubing end assemblies having a shoulder and a rotatable nut bearing on said shoulder comprising a cylindrical member closed at one end and having an opposite open end adapted to fit within said nut to a point adjacent the shoulder, an interrupted thread segment at the said opposite end of said cylindrical member engageable in one of a thread and thread relief in the nut adjacent the shoulder and an external flange on said cylinder bearing on the face of said nut surrounding the opening of the nut. The closed end is preferably provided with an internal axially extending frusto conical plug portion adapted to enter th end of said tubing or hose. The closure is preferably made of poly-vinyl chloride or like soft and deformable plastic resin.

In the foregoing statement of our invention we have pointed out certain objects, purposes and advantages. Other objects, purposes and advantages of this invention will be apparent from a consideration of the following description and the accompanying drawings in which.

Figure 1:
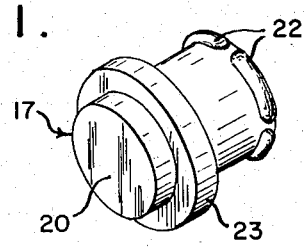
FIG. 1 is an isometric view of a closure according to our invention.

Referring to the drawings we have illustrated a tubing 10 having a radial shoulder 11 swaged thereon adjacent a reduced diameter end portion 12. A nut 13 is freely movable on tubing 10 behind shoulder 11. The nut 13 is provided with internal threads 14 terminating in a radial recess 15 adjacent sealing shoulder 16 on nut 13. Cylindrical closure 17 is formed of PVC and has a closed end 20 and an open end 21 with an interrupted radial thread 22 on the outer surface adjacent the open end. The closure is also provided with a radial flange 23 and an inner frusto conical plug member 24. In operation, the closure is pushed into the nut until the flange 23 bears on the face 13a of nut 13 and the interrupted thread 22 engages in the radial recess 15. At this point the frusto conical plug 24 enters the end of tubing 10. In this condition the closure is in some degrees of tension from flange 23 to thread 22 which prevents the closure from falling out and keeps the sealing shoulder 16 and shoulder 11 and ring in tight engagement, preventing the entry of dirt and foreign matter into the tubing end.

Figure 2:
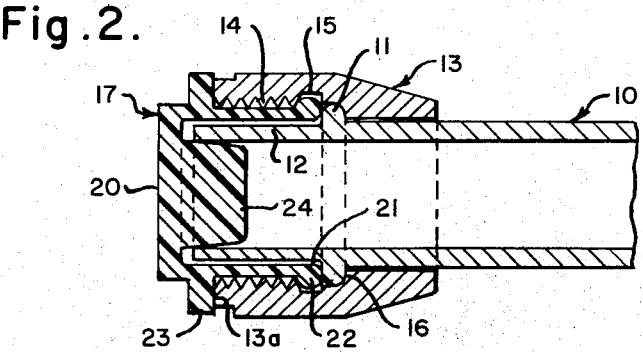
FIG. 2 is a section through a hose end and closure of FIG. 1.
Figure 3:
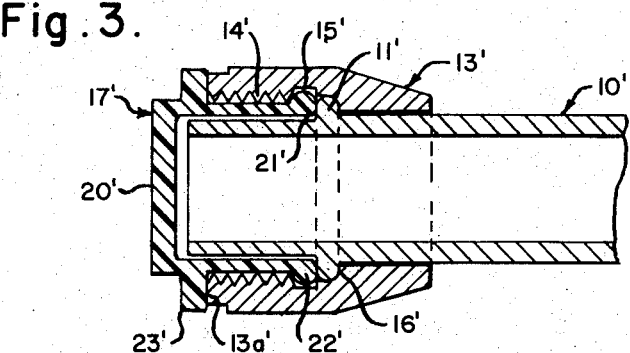
FIG. 3 is a section through a second embodiment of this invention.

In the embodiment illustrated in FIG. 3, the closure is identical to that of FIGS. 1 and 2 except for the omission of the frusto conical plug. Accordingly like parts bear like reference numerals with the addition of a prime sign. In this embodiment a cylinder 17' of PVC closed at one end 20' and open at the other end 21' is provided with interrupted thread 22' which engages in recess 15' in nut 13' precisely as in FIGS. 1 and 2. A radial flange 23' engages the face 13a' of nut 13' and provides the tension force to lock and hold the device in place in the nut. In both embodiments the closure end 21 and 21' abuts against the shoulders 11 and 11' respectively to hold the sealing shoulders 16 and 16' of the nuts 13 and 13' against shoulders 11 and 11' of the tubing thus preventing egress of dirt into the assembly from the rear.

In the foregoing specification we have set out certain preferred embodiments and practices of our invention, however it will be understood that this invention may be otherwise embodied within the scope of the following claims.

We claim:

1. A closure for hose and tubing end assemblies, said assemblies having a circumferentially projecting shoulder adjacent the open end of the tubing and a rotatable nut having an internally projecting circumferential shoulder bearing on said tubing shoulder to provide a seal on installation of the assembly, said nut having internal threads adjacent one end thereof and an internal radial recess located between said threads and said internal shoulder, said one end of said nut being formed with an annular face, said closure comprising:

a cylindrical member closed at one end and open at the other end, said open end being adapted to fit within said nut;

an interrupted thread segment on the outer surface of said cylindrical member adjacent said open end thereof, said thread being adapted to engage said radial recess in said nut; and an external flange projecting radially from said cylindrical member adjacent said closed end thereof, the distance between said flange and said thread segment being substantially equal to the distance between said internal recess and said annular face of said nut;

whereby said external flange bears against said annular face while said thread segment engages said radial recess.

2. A closure as claimed in claim 1 wherein the closed end of said cylinder is provided with an axially extending frusto conical plug portion adapted to enter the end of said tubing or hose being protected.

3. A closure as claimed in claim 1 wherein the closure is made of poly-vinyl chloride resin.

4. A closure as claimed in claim 1 wherein the closure is made of a resilient deformable plastic resin.

5. A closure as claimed in claim 1 wherein the said other open end bears against the shoulder of the tubing urging the nut internal shoulder of the nut into sealing engagement therewith.

6. A closure as claimed in claim 1 wherein the interrupted thread and the external radial flange are relatively positioned to exert a tension force on the cylinder when the closure is in place.

* * * * *